UNITED STATES PATENT OFFICE.

ALFRED MONIN, OF LENT, FRANCE.

LOADING OR FILLING SUBSTANCE FOR USE IN THE MANUFACTURE OF PAPER.

No. 848,916.  Specification of Letters Patent.  Patented April 2, 1907.

Application filed January 18, 1907. Serial No. 352,909.

*To all whom it may concern:*

Be it known that I, ALFRED MONIN, a citizen of the French Republic, residing at Lent, Department de l'Ain, France, have invented certain new and useful Improvements Relating to Loading or Filling Substances for Use in the Manufacture of Paper, of which the following is a specification.

Hitherto in the paper industry natural raw sulfate of lime has been employed as the loading or filling substance in paper-pulp, owing to its low price and also because of its exceedingly white color. The efficiency as regards the filling retained in the paper-pulp is, however, small, the raw sulfate of lime forming when mixed with water a thin paste possessing small binding properties. On the other hand, it has been found necessary to abandon the employment of natural burnt sulfate of lime as a filling for paper-pulp, because in mixing it with water there is obtained somewhat rapidly (according to the degree of burning) a hard body and not a paste. Again, when it is desired to obtain very white burnt sulfate of lime, as is desirable when it is to form the filling for paper, its cost price is too high, owing to the difficulty of burning. These inconveniences are obviated by employing a mixture of these two substances which separately give little or poor result for loading paper. By an intimate and judicious mixture of the two substances a compound is obtained which on the one hand does not harden in water like burnt sulfate of lime and which on the other hand gives an exceedingly thick and unctuous paste which always remains pasty and is consequently adapted for employment as the filling for paper with far greater efficiency than when raw sulfate of lime is employed alone, as this substance gives a paste which is thin and presents poor binding properties when the same quantity of water is used.

Notwithstanding the precautions to be taken in order to obtain burnt sulfate of lime sufficiently white not to deteriorate the whiteness of the mixture the cost price of the product obtained is sufficiently low to permit it to replace advantageously in the paper industry loading substances which are much more expensive, such as the best white talcs, and kaolins of the first quality, which substances are likewise less white than the mixture indicated above, while they are not more efficient than the said mixture.

There is nothing fixed as regards the proportions of the mixture, which may vary in accordance with the degree of burning to which the burnt sulfate of lime employed in the mixture is subjected. In order that the industrial result may be sufficiently appreciable, one-fourth of burnt sulfate should be employed for three-fourths of raw sulfate.

The mixture indicated above, which has not hitherto been utilized as a filling for paper, permits of obtaining in the paper industry a novel and economical result, the characteristics of which is to give with water an unctuous and thick paste which is not obtainable with either one of the two materials if employed separately and in the same mixing proportions with water.

What I claim as my invention, and desire to secure by Letters Patent of the United States, is—

In the manufacture of paper the employment as a filling or loading substance of a mixture of natural raw sulfate of lime and natural burnt sulfate of lime substantially in the manner and for the purposes specified.

In witness whereof I have signed this specification in the presence of two witnesses.

ALFRED MONIN.

Witnesses:
 JEAN GERMIAM,
 GUILLAUME PIOCHE.